(12) United States Patent
Dodge et al.

(10) Patent No.: US 9,164,778 B2
(45) Date of Patent: Oct. 20, 2015

(54) MODAL PROGRESS DIALOG

(71) Applicant: QNX Software Systems Limited, Kanata (CA)

(72) Inventors: Danny Thomas Dodge, Ottowa (CA); Daniel Cardamore, Kanata (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 86 days.

(21) Appl. No.: 13/752,960

(22) Filed: Jan. 29, 2013

(65) Prior Publication Data

US 2014/0215500 A1    Jul. 31, 2014

(51) Int. Cl.
  *G06F 9/44* (2006.01)
  *G06F 3/048* (2013.01)
  *G06F 15/16* (2006.01)

(52) U.S. Cl.
  CPC .............. *G06F 9/4443* (2013.01); *G06F 3/048* (2013.01)

(58) Field of Classification Search
  None
  See application file for complete search history.

(56) References Cited

U.S. PATENT DOCUMENTS 6,038,588 A      3/2000   Nagarajayya et al.
6,639,687 B1 *  10/2003   Neilsen ........................ 358/1.14
2001/0055017 A1 * 12/2001  Ording .......................... 345/440
2003/0182409 A1 *  9/2003  Seaman ......................... 709/223
2012/0159325 A1    6/2012  Stevens et al.

FOREIGN PATENT DOCUMENTS

EP    0 394 160 A2    10/1990

OTHER PUBLICATIONS

European Search Report, European Application No. 13153063.6-1954, Jun. 12, 2013, 6 pgs.

* cited by examiner

*Primary Examiner* — Andy Ho
*Assistant Examiner* — Abdou Seye
(74) *Attorney, Agent, or Firm* — Brinks Gilson & Lione

(57) ABSTRACT

A system and method for modal progress dialog may provide progress feedback to a user when an application accesses or uses system resources on a computing platform. The application may access or use the system resource by invoking an operation via a system interface. Execution of the application may be blocked pending receiving a result of the system resource operation. The progress feedback may be provided by the system interface without the involvement of the application. The progress feedback may include displaying a progress dialog. The progress dialog may be displayed in a window associated with the application. The progress dialog may include a visual indication of a degree of completion of the system resource operation. The progress dialog may mitigate a user misinterpreting delays in completion of the system resource operation as misoperation or failure of the application.

17 Claims, 4 Drawing Sheets

MODAL PROGRESS DIALOG

BACKGROUND

1. Technical Field

The present disclosure relates to the field of human-machine interfaces (HMI). In particular, to a system and method for modal progress dialog.

2. Related Art

Various computing platforms provide for the execution of applications. The applications may include native applications and/or $3^{rd}$-part applications. The applications access and use system resources (e.g. objects in a file system) by invoking system interfaces (e,g, application programming interfaces (API)). In so doing, the applications may be coded with little or no insight or knowledge into the detailed operation and control of the system resources.

When an application invokes a system interface to access or use a system resource there is typically a delay before the system interface responds. The delay can vary from a virtually human-imperceptible time (e.g. on the order of 10's of mS for some local operations) to a user-frustratingly long time (e.g. on the order of 10's of sec to minutes for some network operations). In the absence of some feedback, the user may mistakenly perceive a long delay as misoperation or failure of the application.

BRIEF DESCRIPTION OF DRAWINGS

The system and method may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

A system and method for modal progress dialog may provide progress feedback to a user when an application accesses or uses a system resource on a computing platform. The application may be a native or a $3^{rd}$-party application. The application may access or use the system resource by invoking an operation via a system interface. The system resource operation may include, for example, a file system operation, a network operation, an input/output (I/O) operation or other similar operations. Execution of the application may be blocked pending receiving a result of the system resource operation. The progress feedback may be provided by the system interface without the involvement of the application. The progress feedback may include displaying a progress dialog. The progress dialog may be displayed in a window associated with the application. The progress dialog may include a visual indication of a degree of completion of the system resource operation. The progress dialog may mitigate a user misinterpreting delays in completion of the system resource operation as misoperation or failure of the application.

The system and method for modal progress dialog may allow applications that access or use system resources to be coded with little or no insight or knowledge into the detailed operation and control of the system resources while still providing the user with progress feedback. The progress feedback may be provided by system software while the application is blocked pending receipt of the result of the system resource operation.

Figure 1:
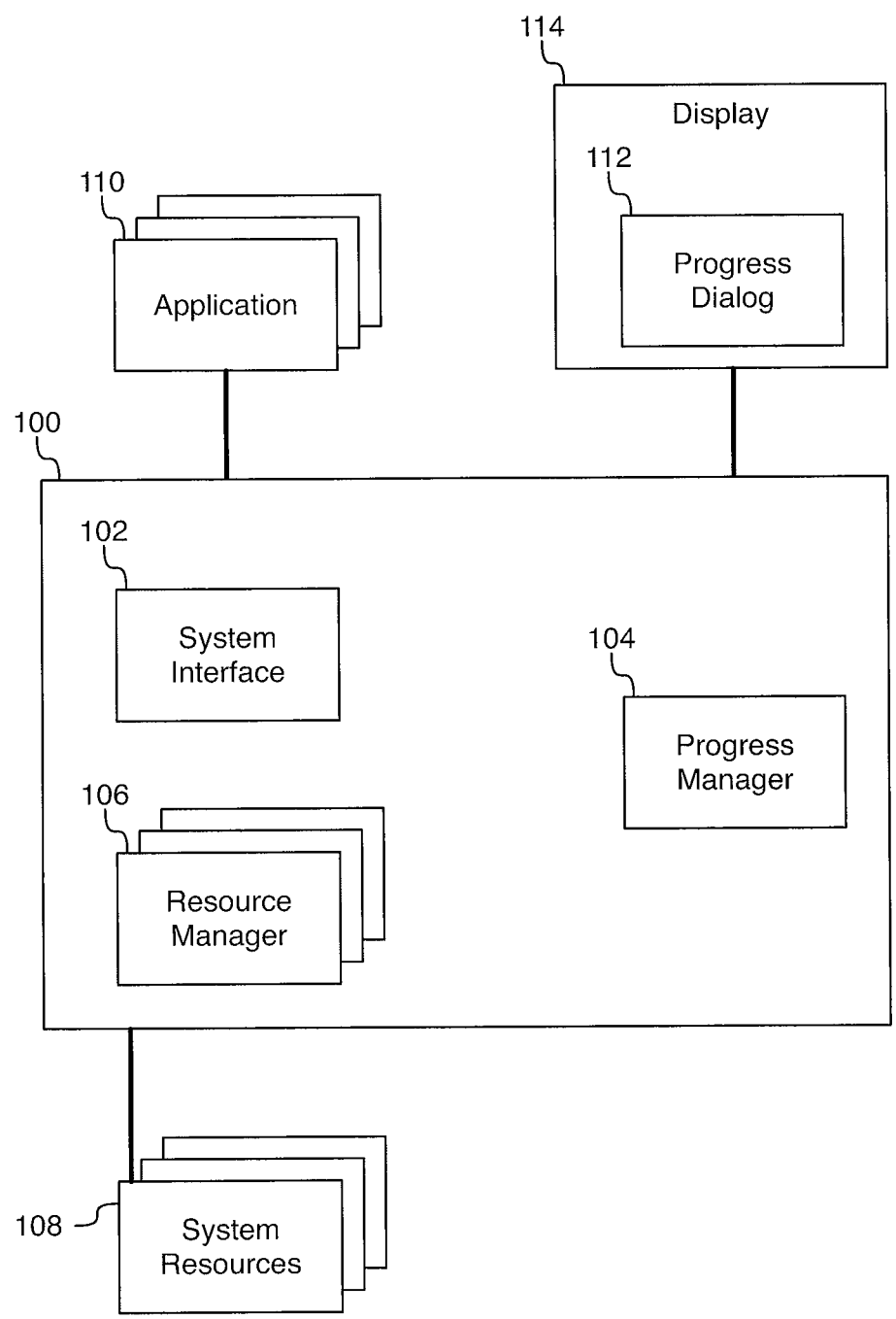
FIG. 1 is a schematic representation of a system for modal progress dialog in a typical operating environment.

FIG. 1 is a schematic representation of a system for modal progress dialog in a typical operating environment. The system 100 may include components of a computing platform and entities executable on the computing platform, such as, a system interface 102, a progress manager 104 and one or more resource managers 106. The system interface 102 may include an application programming interface (API) with entry points that may be invoked to access or use one or more system resources 108. The system interface 102 may be invoked when an action request associated with a system resource is received. The action request may be received from any of one or more applications 110 or other entities executable on the computing platform. The action request may, at least partially, be processed by one or more system libraries (not illustrated).

Each of one or more resource managers 106 may provide management of, and control access to, one or more system resources 108. The action request may, at least partially, be processed by one or more resource managers 106. The resource managers 106 may include, for example, a file system manager, network protocol stack or I/O controller. The system resources 108 may include, for example, files and directories in a local or remote file system, network streams, I/O pipes and other similar system resources. The action request may include operations such as, for example, file open, file read, file write, file copy, file or directory move, file transfer, and other similar operations on system resources 108.

The progress manager 104 may interoperate with the system interface 102, the one or more resource managers 106 and other entities executable on the computing platform. The progress manager 104 may determine when a progress dialog 112 is to be displayed during the processing of an action request. Some action requests may be completed in a time duration that is perceived as immediate or acceptably short by a user. Other action requests may be completed in a time duration that is perceived as long or objectionable by the user. When no feedback is provided to the user for an action request that has long or objectionable duration (delay), the user may mistakenly perceive the delay as misoperation or failure of the application 110. The progress manager 104 may determine when a progress dialog 112 is to be displayed when an expected duration of processing the action request exceeds a threshold. The expected duration may be a function of any one or more of the action requested, the system resource associated with the action requested, a location of the system resource and a measured time to execute a portion of the action (e.g. the time required to complete a first 1MB or a previous 5% of the operation). When the progress manager 104 determines that a progress dialog 112 is to be displayed, the progress dialog may be shown on a display 114 associated with the computing platform.

Figure 2:
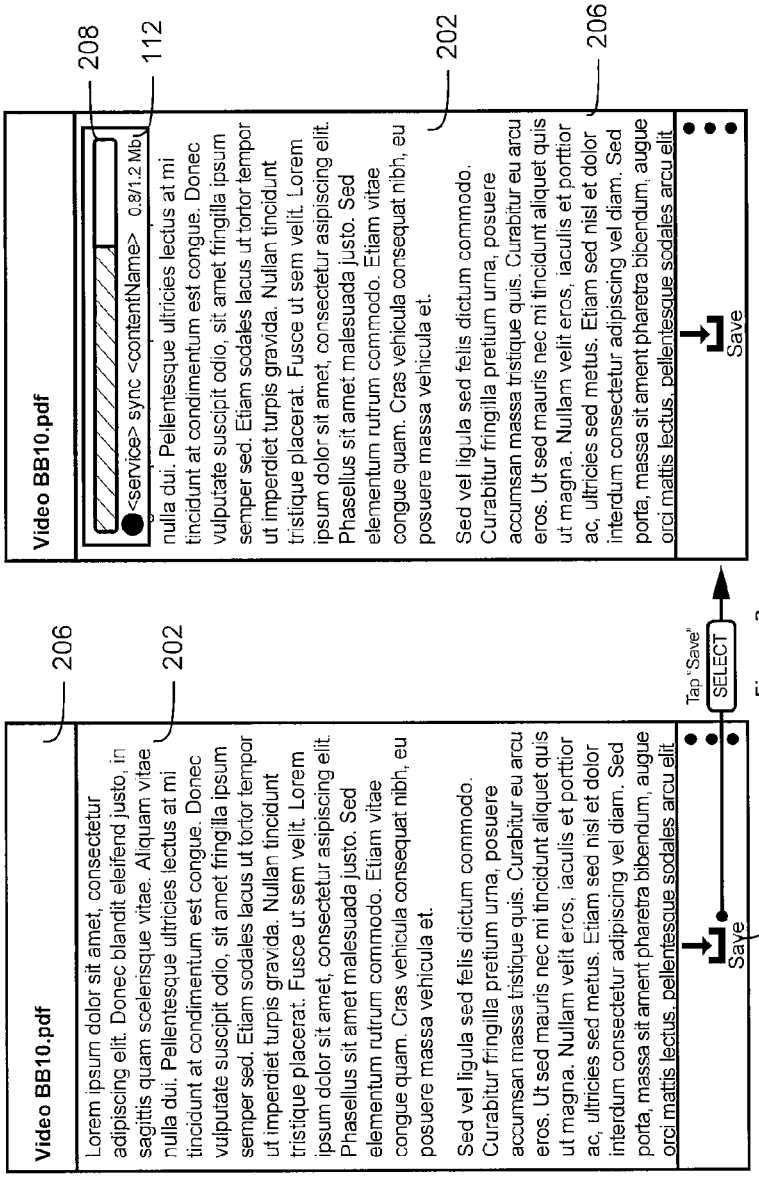
FIG. 2 is a schematic representation of a progress dialog.

FIG. 2 is a schematic representation of an example progress dialog. An application 110, for example a document viewer, presents a user interface (UI) 202 on a display 114. The UI 202 may be contained in a window 206 that occupies a portion of the display 114. Alternatively, the UI 202 or the window 206 may occupy substantially the entire display 114 (a.k.a. full screen). The application 110 may be responsive to various control inputs including, for example, an on-screen touch control 204. Responsive to a control input, the application 110 may invoke the system interface 102 with an action request. In the illustrated example the control input is the selection of a 'Save' button 204 which may cause the document viewer application 110 to invoke the system interface 102 with a 'file write' action request. When the progress manager 104 determines that the 'file write' operation has expected duration that exceeds a threshold, the progress manager 104 may cause the progress dialog 112 to be displayed in the UI 202 or in the window 206 associated with the application 110. The application 110 may not be involved in the displaying of the progress dialog 112 and may be execution-blocked or otherwise suspended pending receipt of the result of the action request. The progress dialog 112 may include a progress indicator 208. The progress indicator 208 may be updated periodically as the system operation progresses and/or as time passes to provide the user with feedback.

Figure 3:
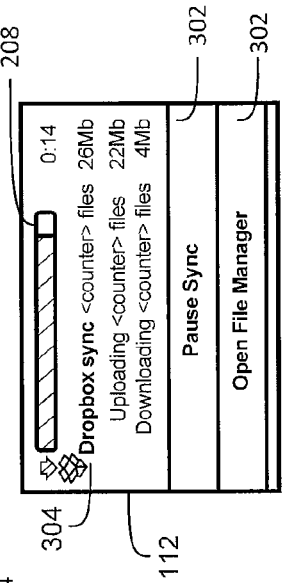
FIG. 3 is a schematic representation of an exemplary progress dialog 104.

FIG. 3 is a schematic representation of an exemplary progress dialog 112. The progress dialog 112 may contain a progress indicator 208 that provides a visual indication of a degree of completion of the system resource operation that may be updated periodically. The progress indicator 208 may take various alternative visual appearances. The progress dialog 112 may include one or more controls 302 that may be operated by the user to, for example, pause, resume or cancel the system resource operation. The progress dialog 112 may also include various identification and/or status information elements 304.

Figure 4:
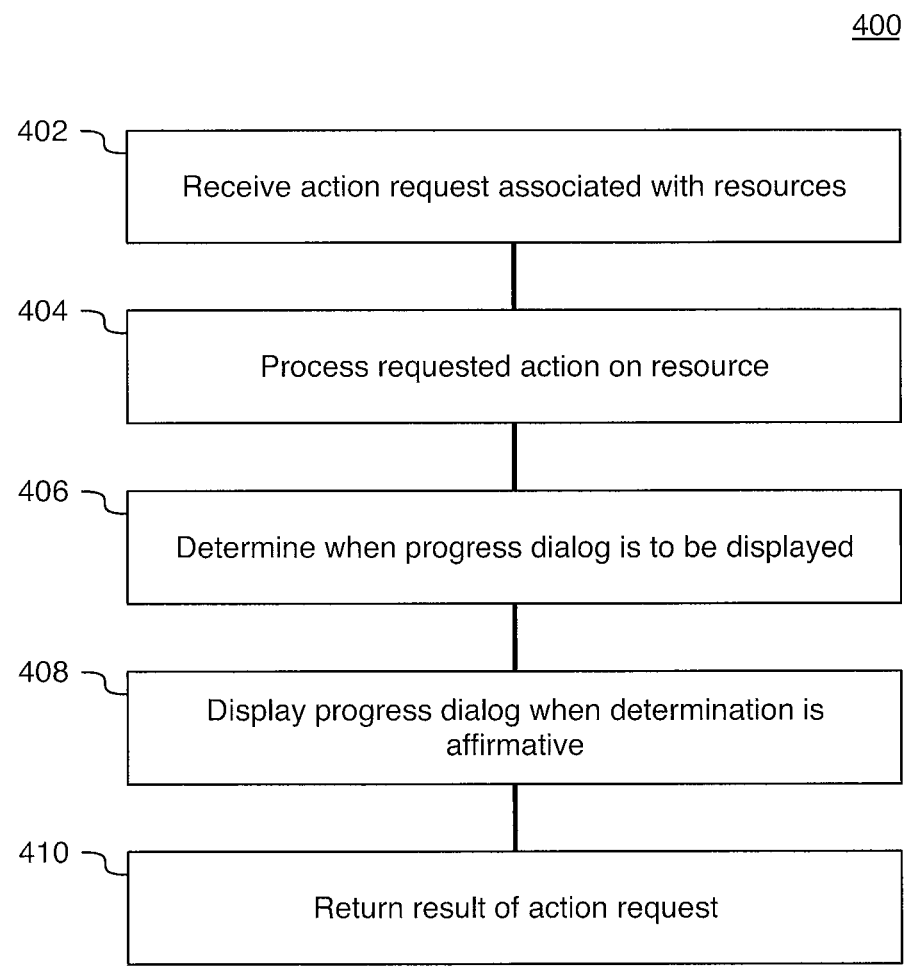
FIG. 4 is a flow diagram representing a method for modal progress dialog.

FIG. 4 is a flow diagram representing a method for modal progress dialog. The method 400 may be, for example, implemented using the systems 100 and 500 described herein with reference to FIGS. 1 and 5. The method 400 may include receiving an action request 402 associated with a system resource 108. The action request may, for example, be received from an application 110 at a system interface 102. The action request may be processed as an operation on the system resource 404. A determination 406 may be made for when a progress dialog 112 is to be displayed. The determination may be affirmative, for example, when the operation has expected duration that exceeds a threshold. A progress dialog 112 may be displayed 408 when the determination is affirmative. The progress dialog 112 may be display in the UI 202 or in the window 206 associated with the application 110. A result of the action request may returned 410 to application 110. The result may be returned when the operation is complete or in some way terminated. Alternatively, multiple results may be return at various points during the processing of the operation. When the operation has completed or is terminated, displaying of the progress dialog 112 may cease.

Figure 5:
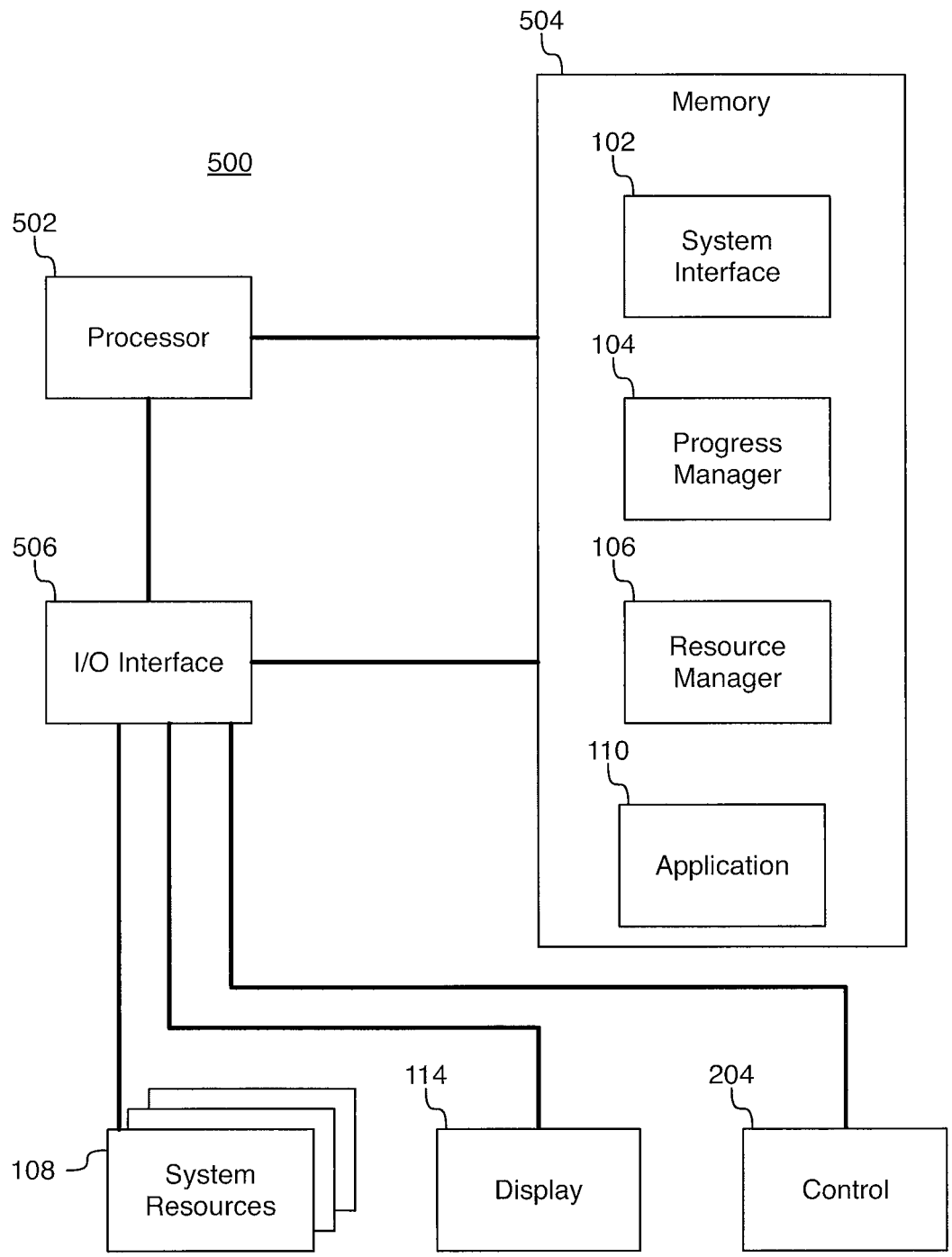
FIG. 5 is a further schematic representation of a system for modal progress dialog.

FIG. 5 is a further schematic representation of a system for modal progress dialog. The system 500 comprises a processor 502, memory 504 (the contents of which are accessible by the processor 502) and an I/O interface 506. The memory 504 may store instructions which when executed using the process 502 may cause the system 500 to render the functionality associated with system interface 102, progress manager 104, resource manager 106 and applications 110 as described herein. In addition the memory 504 may store data including, for example, display buffers associated with progress dialog 112 and the UI 202.

The processor 502 may comprise a single processor or multiple processors that may be disposed on a single chip, on multiple devices or distributed over more that one system. The processor 502 may be hardware that executes computer executable instructions or computer code embodied in the memory 504 or in other memory to perform one or more features of the system. The processor 502 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 504 may comprise a device for storing and retrieving data, processor executable instructions, or any combination thereof. The memory 504 may include non-volatile and/or volatile memory, such as a random access memory (RAM), a read-only memory (ROM), an erasable programmable read-only memory (EPROM), or a flash memory. The memory 504 may comprise a single device or multiple devices that may be disposed on one or more dedicated memory devices or on a processor or other similar device. Alternatively or in addition, the memory 504 may include an optical, magnetic (hard-drive) or any other form of data storage device.

The memory 504 may store computer code, such as code to render functions associated with system interface 102, progress manager 104, resource manager 106 and applications 110 as described herein. The computer code may include instructions executable with the processor 502. The computer code may be written in any computer language, such as C, C++, assembly language, channel program code, and/or any combination of computer languages. The memory 504 may store information in data structures including, for example, data elements used in support of progress dialog 112 and progress indicator 208.

The I/O interface 506 may be used to connect devices such as, for example, system resource 108, display 114, control 204, and to other components of the system 500.

All of the disclosure, regardless of the particular implementation described, is exemplary in nature, rather than limiting. The systems 100 and 500 may include more, fewer, or different components than illustrated in FIGS. 1 and 5. Furthermore, each one of the components of systems 100 and 500 may include more, fewer, or different elements than is illustrated in FIGS. 1 and 5. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for on-demand user control have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A method for modal progress dialog, implement by processor, comprising:
   receiving an action request associated with a resource;
   processing the action on the resource;
   determining when a progress dialog is to be displayed, the determination triggered when a predicted duration of processing the action request exceeds a threshold, where the predicted duration is a function of any one or more of: the action requested, the resource associated with the action requested, a location of the resource, a measured time to execute a portion of the action;
   displaying the progress dialog when the determination is triggered; and returning a result of the action request.

2. The method for modal progress dialog of claim 1, where the action request is received from an application at a system interface.

3. The method for modal progress dialog of claim 2, where execution of the application is blocked until the result of the action request is received by the application.

4. The method for modal progress dialog of claim 2, where the progress dialog is displayed in a window associated with the application.

5. The method for modal progress dialog of claim 1, where the requested action is any of: a file system operation, a network operation and an input/output operation.

6. The method for modal progress dialog of claim 1, where the progress dialog includes a visual indication of an approximate degree of completion of the processing of the action.

7. The method for modal progress dialog of claim 1, where the progress dialog includes a control operable by a user to cancel the action requested.

8. The method for modal progress dialog of claim 7, where the returned result of the action request indicates a failure of the action when the user has operated the control to cancel the action.

9. A system for modal progress dialog comprising:
   a processor; and
   a memory, coupled to the processor, containing instructions executable by the processor for performing:
   receiving an action request associated with a resource;
   processing the action on the resource;
   determining when a progress dialog is to be displayed, the determination triggered by a predicted duration of processing the action request,
   where the predicted duration is a function of any one or more of: the action requested, the resource associated with the action requested, a location of the resource, a measured time to execute a portion of the action;
   displaying the progress dialog when the predicted duration of processing the action request exceeds a threshold; and
   returning a result of the action request.

10. A system for modal progress dialog comprising:
    a system interface to receive an action request associated with a resource;
    a resource manager, comprising at least one processor, to process the action on the resource; and
    a progress manager, comprising at least one processor, to determine when a progress dialog is to be displayed triggered on a predicted duration of the processing of the action, the predicted duration being a function of the action requested, the resource associated with the action requested, a location of the resource, or a measured time to execute a portion of the action,
    where the process manager displays the progress dialog when the determination is triggered by the predicted duration exceeding a threshold.

11. The system for modal progress dialog of claim 10, where the action request is received at the system interface from an application.

12. The system for modal progress dialog of claim 11, where execution of the application is blocked until a result of the action request is received by the application.

13. The system for modal progress dialog of claim 11, where the progress dialog is displayed in a window associated with the application.

14. The system for modal progress dialog of claim 13, where the progress dialog includes a visual indication of an approximate degree of completion of the processing of the action.

15. The system for modal progress dialog of claim 10, where the requested action is any of: a file system operation, a network operation and an input/output operation.

16. The system for modal progress dialog of claim 10, where the progress dialog includes a control operable by a user to cancel the action requested.

17. The system for modal progress dialog of claim 10, where the returned result of the action request indicates a failure of the action when the user has operated the control to cancel the action.

* * * * *